JOSEPH EVES HOVER, OF PHILADELPHIA, PENNSYLVANIA.

*Letters Patent No. 88,169, dated March 23, 1869.*

IMPROVED PAPER-SIZING.

The Schedule referred to in these Letters Patent and making part of the same.

*To all whom it may concern:*

Be it known that I, JOSEPH EVES HOVER, of Philadelphia, Pennsylvania, have invented an Improved Paper-Sizing; and I do hereby declare the following to be a full, clear, and exact description of the same.

My invention consists of a composition for treating paper, consisting of glue, or other equivalent sizing, and acetate of lime, this composition having the property of more thoroughly permeating and becoming incorporated with the "water-leaf," than ordinary sizing, and of improving the quality of the paper, as regards color and surface.

I take ordinary glue sizing, or other size, suitable for treating paper, and mix, with seven gallons of the same, about a gallon of a strong solution of acetate of lime.

This composition, which may be applied in the same manner as other sizing, possesses the property of more thoroughly permeating and becoming more effectually incorporated with the "water-leaf," than ordinary size.

The composition has also the property of rendering the paper whiter, and at the same time improves the surface.

Without confining myself to any precise proportions of ingredients,

I claim as my invention, and desire to secure by Letters Patent—

A composition, consisting of the ingredients described, for the purpose specified.

In testimony whereof, I have signed my name to this specification, in the presence of two subscribing witnesses.

JOS. E. HOVER.

Witnesses:
  JOHN WHITE,
  LOUIS BOSWELL.